United States Patent [19]

Karickhoff

[11] Patent Number: 4,464,524

[45] Date of Patent: Aug. 7, 1984

[54] POLYMERIC THICKENERS AND COATINGS CONTAINING SAME

[75] Inventor: Michael Karickhoff, Matteson, Ill.

[73] Assignee: The Sherwin-Williams Company, Cleveland, Ohio

[21] Appl. No.: 517,494

[22] Filed: Jul. 26, 1983

[51] Int. Cl.³ .............................. C08F 20/06; 524 558
[52] U.S. Cl. .................................... 526/313; 524/558
[58] Field of Search ......................................... 526/313

[56] References Cited

U.S. PATENT DOCUMENTS

| | | | |
|---|---|---|---|
| 3,002,940 | 10/1961 | Holloway | 260/17.4 |
| 3,657,175 | 4/1972 | Zimmerman | 260/29.6 |
| 3,894,980 | 7/1975 | DeTommaso | 260/29.6 RW |
| 4,351,754 | 9/1982 | Dupre | 524/558 |
| 4,384,096 | 5/1983 | Sonnabend | 526/313 |

Primary Examiner—Paul R. Michl
Attorney, Agent, or Firm—Robert E. McDonald; James V. Tura

[57] ABSTRACT

This invention relates to a latex thickener which consists essentially of the free radical addition product obtained by the emulsion polymerization of:

(a) 3–15 parts styrene;
(b) 15–45 parts ethyl acrylate;
(c) 30–60 parts of at least one acid having the formula:

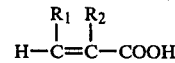

wherein $R_1$ and $R_2$ can be the same or different and are hydrogen or lower alkyl of 1 to about 3 carbons; and (d) 10–25 parts of a mixture of esters; wherein the mixture of esters is the condensation reaction product of reactive amounts of (i) an ethylenically unsaturated cyclic carboxylic acid anhydride containing from 4 to about 8 carbon atoms; and (ii) an ethoxylated alcohol having the general formula:

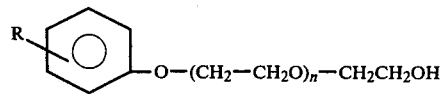

wherein R is from one to three aliphatic radicals of 1 to about 30 carbon atoms each and n is an integer from about 6 to 150; and (iii) a diol containing from about 2 to about 10 carbon atoms.

The novel thickeners of this invention are especially useful in increasing the high shear viscosity of latex coating compositions, and especially coating compositions which contain polymeric vesiculated beads as part of the pigmentation.

35 Claims, No Drawings

POLYMERIC THICKENERS AND COATINGS CONTAINING SAME

BACKGROUND OF THE INVENTION

1. Field of the Invention

This invention relates to novel polymeric thickeners and the process of their use. The thickeners of this invention show special utility when used to thicken latex coating compositions, especially coating compositions containing vesiculated polymeric beads as part of the pigmentation.

2. Description of the Prior Art

Water based latex coatings have gained wide acceptance due to their ease of application, hiding power, drying characteristics, durability and the ease of cleaning brushes, rollers, etc. with soap and water. In order to obtain the proper viscosity to maintain the suspension of pigments in the paint and to provide improved application characteristics, these water based paints normally require the addition of a thickener to adjust their viscosity characteristics.

Numerous thickener compositions have been taught in the prior art. Water-soluble materials employed as thickeners include natural gums and resins, such as starch, gum arabic, modified starch products, dextrins, sodium alginates, and others. Synthetic materials employed as thickeners include polyvinyl alcohol, polyacrylamide, polyacrylic acids and salts thereof, methylcellulose and other cellulose derivatives such as carboxy-methylcellulose and hydroxyethylcellulose, polyvinylpyrrolidone, polyvinylmethylether, polyethyleneoxides and copolymers of polyvinylmethylether and maleic anhydride. Other synthetic polymeric thickeners include esters prepared by the esterification reaction between the acid anhydride groups of a copolymer of an alkylvinylether and maleic anhydride with the terminal hydroxyl groups of a nonionic surfactant of a alkylphenoxyethoxyethanol polymer. The resulting water-soluble polymer is a partial ester which contains free acid groups suitable for subsequent neutralization with a basic material, such as an amine or a metal oxide or hydroxide.

None of the prior art thickeners provides a completely acceptable combination of low shear and high shear viscosities. This is especially true in latex paints containing vesiculated beads as part of the pigmentation. Due to the increased hiding power of these beads, and their lower oil absorption compared to typical pigments, water based paints containing these beads can be manufactured at lower solids than corresponding water based paints containing conventional pigmentation, and it is especially difficult to obtain the required film build upon brush or roller application of these coatings.

The high shear rate (e.g. greater than about 5,000 sec.$^{-1}$) viscosity of a coating primarily effects the application characteristics of film build and brush drag and increased high shear viscosities provide greater film builds. The mediumshear rate (approximately 50 to 1,000 sec.$^{-1}$) viscosity primarily affects brush load and dripping. Low shear rate viscosity (e.g. less than about 50 sec.$^{-1}$) primarily affects flow, leveling and sag resistance. With the prior art thickeners, it is extremely difficult to obtain a high shear rate viscosity sufficient to obtain proper film build, especially in lower solids paints, e.g. less than 45% NVM, and still maintain an acceptable low shear viscosity which is necessary for flow and leveling.

The novel thickeners of this invention overcome the limitations of the prior art and provide a thickener which will impart excellent high shear rate viscosities and still allow excellent flow and leveling as the coating dries.

SUMMARY OF THE INVENTION

This invention relats to a thickener consisting essentially of the free radical addition product obtained by the emulsion polymerization of :

(a) 3-15 parts styrene;
(b) 15-45 parts ethyl acrylate;
(c) 30-60 parts of at least one acid having the formula:

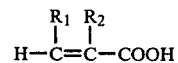

wherein $R_1$ and $R_2$ can be the same or different and are hydrogen or lower alkyl of 1 to about 3 carbons; and (d) 10-25 parts of a mixture of esters; wherein the mixture of esters is the condensation reaction product of reactive amounts of (i) an ethylenically unsaturated cyclic carboxylic acid anhydride containing from 4 to about 8 carbon atoms; and (ii) an ethoxylated alcohol having the general formula:

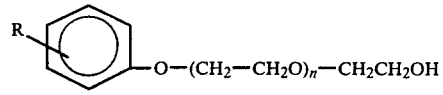

wherein R is from one to three aliphatic radicals of 1 to about 30 carbon atoms each and n is an integer from about 6 to 150; and (iii) a diol containing from about 2 to about 10 carbon atoms.

This invention also relates to a method for thickening an aqueous system comprising water and a natural or synthetic polymer by the addition of a thickening amount of the novel thickener of this invention. This invention also provides novel coating compositions which comprise a natural or synthetic latex vehicle in combination with a thickening amount of the novel thickeners of this invention, especially in combination with vesiculated beads. The thickeners of this invention are especially useful in thickening latex coatings having an NVM (% weight solids) less than about 54% .

It is therefore an object of this invention to provide a novel thickener which can impart increased high shear rate viscosities. Another object of this invention is to provide a process for thickening aqueous systems by the addition of a novel thickener. A more limited object of this invention is to provide improved aqueous coating compositions comprising a natural or synthtic latex vehicle, the thickener of this invention, and, optionally, vesiculated beads. It is a further object of this invention to provide aqueous coating compositions having improved film build as well as good flow and leveling.

These and other objects of the invention will be apparent from the following description.

DETAILED DESCRIPTION OF THE INVENTION

In addition to the thickener described above, this invention relates to a method for thickening an aqueous system comprising water and a natural or synthetic polymer, which method comprises adding a thickening amount of a thickener to said aqueous system, and thereafter adjusting the system to a pH between about 6.0 to about 10, and preferrably between 7 to 9, typically by adding an alkaline material to the aqueous system, and wherein said thickener consists essentially of the free radical addition product obtained by the emulsion polymerization of:
(a) 3–15 parts styrene;
(b) 15–45 parts ethyl acrylate;
(c) 30–60 parts of at least one acid having the formula:

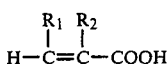

wherein $R_1$ and $R_2$ can be the same or different and are hydrogen or lower alkyl of 1 to about 3 carbons; and
(d) 10–25 parts of a mixture of esters; wherein the mixture of esters is the condensation reaction product of reactive amounts of (i) an ethylenically unsaturated cyclic carboxylic acid anhydride containing from 4 to about 8 carbon atoms; and (ii) an ethoxylated alcohol having the generalformula:

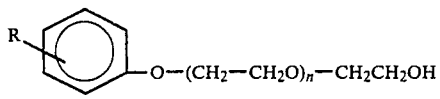

wherein R is from one to three aliphatic radicals of 1 to about 30 carbon atoms each and n is an integer from about 6 to 150; and (iii) diol containing from about 2 to about 10 carbon atoms.

In such an application, the thickeners act as an in situ thickener which can be added in its unthickened acid form and then thickened upon neutralization. The thickeners of this invention obtain their exceptional utility due to their unique combination of hydrophilic and hydrophobic segments and the branching provided by the adduct of the unsaturated anhydride and the diol. The mixture of esters is conveniently prepared by admixing reactive amounts of the unsaturated cyclic carboxylic acid anhydride, the ethoxylated alcohol and the diol and maintaining the mixture at a reaction temperature sufficient to cause the reaction of the anhydride and the alcohols (typically 200°–250° F.) in a nitrogen atmosphere. The reaction can be maintained at this temperature for about 2 to 18 hours, and should be maintained at least until the desired acid value is achieved.

The anhydrides which are suitable for reaction with the ethoxylated alcohol and the diol to produce the esters are those unsaturated cyclic anhydrides containing from 4 to about 8 carbon atoms. Representative examples of these anhydrides include maleic anhydride, itaconic anhydride, citraconic anhydride and the like. Maleic anhydride is especially preferred because of its availability, cost and reactivity.

The ethoxylated alcohols used to react with the anhydrides are those having the general formula:

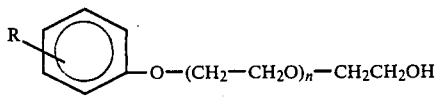

wherein R is from one to three aliphatic radicals of 1 to about 30 carbon atoms each and n is an integer from 6 to about 150. These ethoxylated alcohols can be conveniently prepared by the reaction of the appropriate aliphatic phenol and ethylene oxide. Representative R groups include ethyl, butyl, pentyl, nonyl, dodecyl, hexadecyl, and so forth. The R groups may be straight chain, branched or cyclic. It is preferred that R be a single aliphatic radical, and it is especially preferred that R represent a single alkyl group of at least 6 carbon atoms.

Examples of some of the ethoxylated alcohols that are commercially available and which are defined by the above formulation include the "Igepals" (trademark of the General Aniline and Film Corporation). Representative examples of the Igepals include nonylphenoxypoly(ethyleneoxy)ethanols, dodecylphenoxypoly(ethylneoxy)ethanols, and dinonylphenoxypoly(ethyleneoxy)ethanols. Especially preferred is the ethoxylated alcohol where n is 29 and R is nonyl.

Useful diols include those diols having from about 2 to about 10 carbon atoms. Especially preferred are diols having two primary hydroxyls. Representative diols include, ethylene glycol, 1,4-butanediol 1,6-hexanediol, 1,9-nonanediol, neopentyl glycol, 1,4-cclohexane dimethanol, 2,2,4-trimethyl 1,3-pentane dioland so forth.

The anhydride should be present in an amount ranging from about 0.8 to about 1.2 moles of anhydride for each chemical equivalent of hydroxyl, and it is especially preferred to have about 1.0 mole of anhydride for each chemical equivalent of hydroxyl. This ratio provides the "half ester" product having free acid groups on the unsaturated products. At the preferred reaction temperatures of less than 250° F. very few, if any, of the free carboxyl groups will react with the available hydroxyl due to the faster ring opening reaction of the anhydride, thereby maximizing the preferred product.

The mole ratio of ethoxylated alcohol to diol should be greater than 1.1/1 and preferably between about 2/1 and 15/1. If desired, the reaction of the anhydride and the ethoxylated alcohol and the reaction of the anhydride and the diol can be conducted as separate reaction and then the products can be mixed to provide the combination of materials having the proper mole ratio of ethoxylated alcohol to diol. Preferably, however, for ease and simplicity of the reaction, all of the three reactants can be added to the same reaction vessel to produce the mixed ester product.

An especially preferred combination for the mixture of esters utilized as part of the thickener in this invention involves maleic anhydride, an ethoxylated alcohol having the formula:

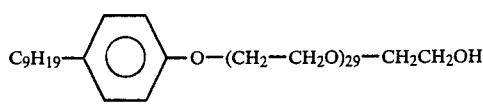

and 1,6-hexane diol. It is especially preferred to have a mole ratio of maleic anhydride/ethoxylated alcohol/1,6-hexane diol of approximately 10/8/1.

As used herein to refer to the relative proportions of anhydride to ethoxylated alcohol to diol, the term "reactive amounts" means that about 0.8 to about 1.2 and preferably 1.0 moles of anhydride are present for each chemical equivalent of hydroxyl and that the mole ratio of ethoxylated alcohol to diol is at least 1.1/1. Preferably the ratio will be between about 2/1 and 15/1, and most preferably between 5/1 and 10/1.

The unsaturated acids which are useful in the manufacture of the thickener include, representatively, acrylic acid, methyacrylic acid, and crontonic acid and mixtures thereof. If a mixture of unsaturated acids is used any of the acids can be utilized in a level from 0 to 100% of the total acid. Generally, methacrylic acid is preferred due to the excellent balance of high shear and low shear viscosity imparted to thickeners utilizing that monomer.

The presence of at least some ethyl acrylate as one of the monomers has surprisingly been found to be critical in developing the required balance of high and low shear viscosity performance. Replacing the ethyl acrylate with butyl acrylate or styrene, for example, results in a thickener which fails to impart sufficient high shear viscosity upon neutralization.

The thickener itself is conveniently prepared by the free radical emulsion polymerization of the required monomers and unsaturated esters. It is especially convenient to add the premixed solution of all of the monomers in a dropwise fashion into an aqueous solution containing emulsifier or dispersing agent and a free radical catalyst. The thickener of this invention is conveniently prepared by conventional, aqueous emulsion polymerization techniques using appropriate emulsifying or dispersig agents for emulsfying the monomers and for maintaining the polymer obtained in dispersed condition. Typically, the reaction temperature will be maintained between room temperature and about 200° F. under agitation and the reaction will be allowed to continue until essentially all of the monomer has been reacted. The emulsifier used will typically be about 0.5 to about 5% of the weight of the monomers. Examples of emulsifiers that may be used include anionic types, such as the alkali metal salts of higher alkyl sulfates, or sulfonates and nonionic types, such as the ethylene oxide derivatives of nonylphenol.

The free radical catalysts which are useful in the manufacture of the thickener include water soluble initiators, such as the alkali metal or ammonium persulfates, typically in amounts from about 0.1 to about 3% of the weight of the monomers. It is also convenient, as is well known in the art, to use a redox catalyst system in which the persulfate or a similar initiator is used in conjunction with a reducing agent, such as sodium metabisulfite in about the same proportion as the initiator. Typically, the thickener produced will be between about 10 to about 45% weight solids, and especially useful viscosities are attained at about 30% solids.

Although it is preferred to utilize the thickener as the aqueous solution, it is possible, for some purposes, to dry the dispersion by techniques known in the art, such as spray drying, or drum drying, whereby a powder is obtained which can then be dissolved or dispersed in other solvents or other aqueous solutions.

The thickeners of this invention are useful in thickening a variety of materials. The thickeners are especially useful in any aqueous acid or relatively neutral system, e.g. having a pH less than about 6, because the thickener can be added in its low viscostiy, acid state and the thickening induced by adjusting the pH after addition to a level above about 6.0 and typically between about 6.0 to 10.0 or higher by the addition of basic materials such as amines or alkali metal hydroxides to achieve the desired viscosity levels. If the aqueous system to be thickened is already alkaline, sufficient thickening may occur upon the addition of the thickener even without the addition of base.

The thickener need only be added in a thickening amount, that is, an amount sufficient to impart the desired viscosity behavior. This level depends upon the nature of the system being thickened and typically the thickener will be present in an amount ranging from about 1 to about 35% by weight solids of the material being thickened. In the case of latex coating compositions, the thickener will typically be present in an amount ranging from about 10 to about 25% by weight solids based upon the weight of the latex vehicle.

The thickener of this invention could be used to thicken aqueous printing inks, aqueous pigment slurries, aqueous coatings for textile fabrics, drilling muds such as alkaline clay dispersions, and other aqueous solutions which may or may not also contain some organic solvent. The thickener of this invention is especially useful in thickening aqueous systems comprising water and a natural or synthetic polymer, especially latex polymers useful as coatings, and is particularly useful in lower solids coatings, e.g. less than about 45% solids by weight, which contain vesiculated beads as part of the coating pigmentation.

Illustrative natural or synthetic polymers include latices which are dispersions, emulsions, suspensions or the like of the following representative polymers: acrylics; vinyl acetate homopolymers or copolymers such as copolymers with acrylates or ethylene; homopolymers and copolymers of styrene including: styrene-butadiene, carboxylated styrene-butadiene, polystyrene and copolymers of styrene and unsaturated acid anhydrides such as maleic anhydrides; polyvinyl alcohol; natural rubber; synthetic rubbers such as butyl rubber, chlorinated or hydrochlorinated rubber latex, and isoprene rubber latex; gums; homopolymers and copolymers of acrylonitrile with a diene like isoprene, butadiene, or chloroprene; homopolymers and copolymers of vinyl halides such as vinyl chloride, and vinylidene chloride, with each other or with acrylonitrile or vinyl esters such as vinyl acetate; homopolymers and copolymers of acrylic and methacrylic acid and their esters and derivatives with or without other monomers have —C=C— groups; polybutadiene; polyisoprene; olefinic resins such as polyethylene, polypropylene, etc.; carboxylated natural and synthetic latices and similar polymeric materials. These latices may also be modified with alkyd materials as is well known in the art.

The manufacture or preparation of the natural and synthetic polymers is well known in the art and any conventional method for their preparation may be utilized. The thickener of this invention shows special utility in acrylic and vinyl acrylic latex formulations which are useful as coatings.

The coating compositions of this invention comprising a natural or synthetic latex vehicle, and a thickening amount of the thickener of this invention may contain other conventional paint ingredients to improve the performance of the coatings. For example, solvents such as glycols can be added to the paints at concentrations up to about 35% by weight to act as coalescing solvents. Conventional additives such as surfactants, microbiocides, conventional thickeners, dispersants, wetting agents, defoamers, flow agents and the like can also be added as is well known in the art. Normally, the coating compositions will also contain pigmentation. Typical pigments include titanium dioxide, clays, zinc oxide, carbon black, mica, silicas, calcium carbonate, phthalocyanine blue and green pigments, chrome yellow pigments and the like.

It is especially preferred in the practice of this invention to include vesiculated beads as at least part of the opacity producing pigmentation. The total amount of vesiculated beads and pigment, if used, need only be enough to provide the desired opacity and color to the finished coating. Typically the weight of beads and/or pigment will be at least as great as the weight of non-volatile latex vehicles solids and could be ten times as great or more.

As used herein, the term "vesiculated beads" means those synthetic, opaque, insoluble polymeric beads containing a plurality of microvoids and, optionally, a pigment such as titanium dioxide dispersed within the beads. Vesiculated beads provide enhanced opacity in coatings due to the scattering of light caused by the microvoids and, when present, the dispersed pigment contained therein. In general, vesiculated beads are conveniently prepared by the suspension polymerization of dispersed polymeric precursors in water.

In the preferred vesiculated beads for this invention, the polymer precursors are typically a solution of an unsaturated acid-functional polyester resin in styrene. Such beads have been commercially available under the trademark Spindrift (a registered trademark of Dulux Australia Ltd.). This technique has been described in detail in U.S. Pat. Nos. 3,822,224; 3,879,314; and 3,933,579; and PCT Internation Application No. PCT/AU80/00097, having International Publication No. WO81/01711. The teaching of each of these patents is hereby incorporated by reference.

Basically, these disclosures teach the manufacture of vesiculated beads as an aqueous slurry in the presence of base, usually amine, by the formation of a water-in-oil-in-water double emulsion at the required bead size, wherein the "oil" is a polymerizable solution of the polymeric precursor, e.g. an unsaturated polyester resin in styrene. A free radical catalyst is used to polymerize the solution thereby producing a crosslinked synthetic bead containing microvoids therein.

If it is also desired to incorporate titanium dioxide or another pigment into the bead an aqueous dispersion of the pigment is emulsified in the polymerizable solution as a fine water-in-oil emulsion. This first emulsion is then mixed into an aqueous solution of stabilizer polymers, typically polyvinyl alcohol and hydroxyethylcellulose, forming the water-in-oil-in-water double emulsion at the required bead size. A free radical catalyst system, e.g. redox or peroxide, is used to initiate the polymerization of the polyester and styrene to produce the cured beads. The pigmented, vesiculated beads can be easily incorporated as an aqueous slurry into water-based paints. The beads contain pigment and water-filled vesicles encapsulated within a crosslinked polymer particle. Upon drying, after the paint is applied, the vesicles empty and develop their microvoid hiding power.

The preferred polymerizable solution comprises an unsaturated carboxy-functional polyester resin (e.g. prepared by the reaction of polybasic acids or their corresponding anhydrides and a dihydric alcohol) in an ethyleneically unsaturated monomer. Polymerizable unsaturation is introduced into the polyester by the selection of an unsaturated acid or anhydride optionally in combination with a saturated acid or anhydride.

Suitable acids for producing the beads are, for example: unsaturated alipuhatic acids such as maleic, fumaric, itaconic, citraconic and mesaconic; saturated aliphatic acids such as malonic, succinic, glutaric, adipic, pimelic, azelaic, tetrahydrophthalic, chlorendic and sebacic acids; and aromatic acids, such as phthalic, isophthalic, terephthalic, tetrachlorophthalic, trimellitic and trimesic.

Suitable dihydric alcohols are, for example, ethylene glycol, poly (ethylene glycols) e.g. diethylene glycol, 1,6-hexanediol, propylene glycol, dicyclohexanol and neopentyl glycol. Alternatively the alcohol may be one which initially contained three or more hydroxyl groups, the groups in excess of two optionally being, at least in part, etherified with, for example, a monohydric alcohol, e.g. methanol, ethanol and n-butanol or esterified with a monobasic acid, e.g. benzoic acid, or chain-like aliphatic acids of up to 18 carbon atoms chain length, e.g. coconut oil monoglyceride.

The methods by which unsaturated polyesters of this type are formulated and made are well known in the art. Typically, the polyesters will have an acid value of 10 to about 45 and a number average molecular weight between 1,000 and 100,000. The acid can be present in a stoichiometric excess over the alcohol to produce the acid functional polyester or, optionally, the alcohol can be present in the stoichiometric excess and the reaction allowed to proceed only until the desired acid value is obtained. It is often convenient to have up to about a 25% stoichiometric excess of glycol.

The unsaturated monomer in which the unsaturated polyester resin is dissolved and crosslinked must be essentially water-insoluble. Monomers which have solubility at 20° C. of less than 5% (w/w) in water are considered to be suitably water-insoluble for this purpose. A single monomer or a mixture of monomers may be used and in general the monomer will contain only a single polymerizable double bond. However, it is known that polyfunctional monomers, that is monomers containing more than one polymerizable double bond, may also be used to crosslink unsaturated polyester resins. Such poly-functional monomers are, however, normally present only as a minor constituent of a mixture of monomers, the major proportion of which is mono-functional monomer. Hence mixtures comprising, e.g. divinyl benzene, may be used in the manufacture of the vesiculated beads.

The preferred ethylenically unsaturated monomers for the manufacture of the beads are styrene, vinyl toluene and methyl methacrylate, because of the ease with with which they can be copolymerized with the unsaturated polyester resin. For the best results, the monomer should comprise at least 50% by weight of styrene, and it is usually preferred to use styrene as the only monomer.

Bearing in mind the requirements that the total monomer mixture must be essentially insoluble in water and also be a solvent for the unsaturated polyester resin, there may be present, in a minor proportion, other polymerizable unsaturated monomers which can modify the physical properties of the beads comprising the co-reacted resins. Typical co-monomers are, for example, ethyl acrylate, n-butyl methacrylate, acrylonitrile, and triallyl cyanurate. In general, the upper limit of usefulness of such monomers is about 10% by weight based on the total monomer used. Higher concentrations generally give granules which are either too brittle or too rubbery to be used effectively in paints.

Optionally, a few percent by weight of a non-polymerizing organic liquid, e.g. n-butanol or toluene, may be mixed with the monomer to increase the solubility of the polyester resin therein or may be introduced as an incidental part of the process, e.g. in preparing the polyester.

An especially preferred method of manufacturing the vesiculated beads is shown in Example A below, which is taken from U.S. Patent Application Ser. No. 517,491, filed concurrently herewith, the teaching of which is hereby incorporated by reference.

The following examples are intended to illustrate the invention but are not presented as limitations upon the scope of the claims. Unless otherwise indicated, the term "parts" means parts by weight.

EXAMPLE A

Preparation of Vesiculated Beads

An aqueous phase consisting of 10 parts ice, 11.08 parts water, 2.20 parts of a 75% solution of sodium sulfated dioctyl succinate in butanol, 0.32 parts ethanol, and 0.79 parts defoamer were mixed using a high speed disperser and a Cowles blade to obtain a homogeneous solution. Over a three minute period was added 53.2 parts titanium dioxide which was dispersed at a high impeller speed for about 15 minutes. The speed of the agitator was reduced and 1.04 parts diethylene triamine in 6.66 parts water was added and the aqueous dispersion was mixed for about 2 minutes.

In a separate mixing vessel 49.0 parts unsaturated polyester (reaction product of propylene glycol, fumaric acid and isophthalic anhydride in a mole ratio of 4.72/3.11/1 having an acid value of 12.4, as a 58% solution in styrene), and 18.52 parts styrene were mixed under low speed agitation. With the agitator maintained at low speed the aqueous dispersion was added to the polyester/styrene mixture over about a 2 minute period. The agitator speed increased for about 3 minutes, then reduced and maintained for about 15 minutes, thereby preparing a water-in-oil emulsion.

In a separate mixing vessel 43.23 parts of a 1.5% solution of hydroxyethyl cellulose in water, 47.97 parts of a 7.5% solution of polyvinyl alcohol in water, and 110.27 parts water were mixed at low speed. With the agitator maintained at low speed the water-in-oil emulsion from the previous step was transferred to the mixing vessel over a 4 minute period. The agitation was then increased and held for 20 minutes.

After the 20 minute period the agitator speed was reduced and 102.57 parts hot (52° C.) water was added followed by 0.921 parts cumene hydroperoxide. After mixing several minutes 0.159 parts of a 10% solution of diethylenetriamine in water was added followed by 1.05 parts of a 1% ferrous sulfate solution. Stirring was continued for 2 minutes and then stopped. The reaction temperature climbed from about 34° C. to about 52° C. in about 90 minutes. The reaction mixture was allowed to stand overnight. The product was a 26.6% solid aqueous suspension of pigmented vesiculated beads at 9.36 pounds per gallon.

EXAMPLE I

Preparation of Mixture of Esters

A mixture of esters was prepared by charging a reaction vessel with 3850.0 parts Igepal CO-880 (an ethoxylated alcohol manufactured by General Aniline and Film Corporation having the structure:

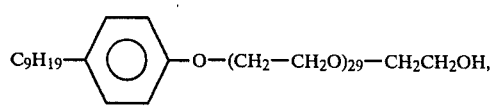

305.8 parts maleic anhydride, and 37.0 parts 1,6-hexanediol. The reaction vessel was equipped with a nitrogen inlet, a reflux condenser, a thermocouple and a mechanical stirrer. The material was heated slowly to 220° F. in a nitrogen atmosphere. The agitation was started as soon as possible. The reaction was maintained at 220° F. for approximately 16 hours.

EXAMPLE II

Preparation of Latex Thickener

A latex thickener was prepared by charging a reaction flask with 1,290.8 parts deionized water, 1.2 parts Sipon ES (sulfated lauryl ethoxylate manufactured by the Alcolac Chemical Company), and 2.0 parts potassium persulfate. The flask was equipped with a reflux condenser, two addition funnels and a mechanical stirrer. The flask was heated to approximately 160° F. at which point agitation was started. The dropwise addition of 52 parts of Sipon ES was continued over a 3 hour period. Concurrently, the premixed monomer solution of 230.0 parts methacrylic acid, 140.0 parts ethyl acrylate, 40.0 parts styrene, and 90.0 parts of the mixed esters of Example I were added dropwise through a second addition funnel over the 3 hour period. During the addition time the reaction temperature was maintained between 155°–165° F. The stirring was continued until essentially all of the monomers had been reacted. The latex was cooled and strained through an organdy bag. The measured latex solids were 27.9% (theory 28%) and the viscosity was 47 KU.

EXAMPLE III

In order to demonstrate the criticality of the combination of monomers claimed in this invention, the following three latex thickeners were prepared at approximately 28% weight vehicle solids according to the process described in Example II.

| Thickener | Weight % Composition | | | | |
| | Methacrylic acid | Styrene | Esters of Example I | Ethyl Acrylate | Butyl Acrylate |
| --- | --- | --- | --- | --- | --- |
| A | 40 | 10 | 15 | 35 | — |
| B | 40 | 10 | 15 | — | 35 |
| C | 40 | 45 | 15 | — | — |

The thickeners were added to the paint composition shown below and tested for ICI viscosity.

The following paint composition was prepared by dispersion in a Cowles dissolver as is well known in the art (sufficient water was added to adjust the NVM to about 33.0%):

| Raw Materials | Parts by Weight |
|---|---|
| Latex Vehicle[1] | 84.8 |
| Pigments[2] | 204.1 |
| Vesiculated Beads[3] | 225.3 |
| Additives[4] | 11.8 |
| Ammonia | 10.0 |

[1] commercially available vinyl acetate acrylic latex vehicle (55% by weight solids, pH about 5.0)
[2] combination of titanium dioxide, clay and silica pigments
[3] prepared as an Example A
[4] conventional defoamers, dispersants and surfactants.

This paint composition was then treated with each of four thickeners. 23.9 parts of each of thickeners A, B and C and about 4.0 parts of thickener D (conventional 100% hydroxy ethyl cellulose thickener) were added to the paint compositions and the paints were tested for high shear (approximately 10,000 sec$^{-1}$) viscosity on an ICI viscometer. The results are outlined below:

| Thickener Sample | ICI Viscosity (poise) |
|---|---|
| A | 0.95 |
| B | 0.40 |
| C | 0.60 |
| D | 0.75 |

As clearly shown by these results the high shear viscosity is significantly higher for the thickener of Example A as opposed to similar thickeners B and C demonstrating the criticality of the claimed raw materials as well as improvement over the conventional hydroxy ethyl cellulose thickener.

EXAMPLE IV

The thickener of Example II was compared to hydroxy ethyl cellulose (HEC) in the following alkyd acrylic formulas:

|  | NON BEAD | | BEADS | |
|---|---|---|---|---|
|  | HEC | Ex. II | HEC | Ex. II |
| Water | 319 | 289 | 314 | 285 |
| Ammonia | .5 | 9 | .5 | 9 |
| Additives[1] | 66 | 66 | 64 | 64 |
| Silicate Extender | 155 | 155 | 50 | 50 |
| Thickener | 4 | 25 | 4 | 25 |
| TiO$_2$ Slurry | 235 | 235 | 205 | 205 |
| Vesiculated Bead Slurry from Example A | — | — | 200 | 200 |
| Acrylic Latex[2] | 290 | 290 | 170 | 170 |
| Alkyd Modifier[3] | 29 | 29 | 24 | 24 |
| These paints had the following characteristics: | | | | |
| Wt./Gal. (pounds/gal.) | 10.98 | 10.98 | 10.32 | 10.32 |
| NVM (%) | 49 | 49 | 39 | 39 |
| ICI Viscosity (poise) | .6 | 1.0 | .5 | .9 |

[1] additives are conventional dispersants, surfactants, coalescents, glycol solvents, mildewcides, defoamers, preservatives, etc.
[2] commercially available acrylic (48.0% NVM, pH about 9.0)
[3] commercially available fatty acid alkyd resin This example clearly shows significantly improved ICI (high shear) viscosity both in the beaded and conventional pigmented systems when the thickeners of this invention are utilized.

EXAMPLE V

The thickener of Example II was compared to hydroxy ethyl cellulose in the following vinyl acrylic formulas:

|  | NON BEAD | | BEADS | |
|---|---|---|---|---|
|  | HEC | Ex. II | HEC | Ex. II |
| Water | 492 | 460 | 439 | 408 |
| Ammonia | 2 | 9 | 2 | 9 |
| Additives[1] | 23 | 23 | 22 | 22 |
| Silica and Silicate Extenders | 359 | 359 | 174 | 174 |
| TiO$_2$ Slurry | 90 | 90 | 40 | 40 |
| Vesiculated Bead Slurry from Example A | — | — | 227 | 227 |
| Thickener | 5 | 28 | 5 | 28 |
| Vinyl Acrylic Latex[2] | 145 | 145 | 84 | 84 |
| These paints had the following characteristics: | | | | |
| Wt./Gal. (pounds/gal.) | 11.11 | 11.11 | 9.93 | 9.93 |
| NVM (%) | 46.5 | 46.5 | 33 | 33 |
| ICI Viscosity (poise) | .7 | 1.1 | .5 | 1.0 |

[1] additives as in Example IV
[2] commercially available vinyl acrylic latex

This example also clearly shows significantly improved ICI viscosity both in the beaded and conventional pigmented systems when the thickeners of this invention are utilized.

While this invention has been described by a number of specific embodiments, it is obvious that other variations and modifications may be made without departing from the spirit and scope of the invention as set forth in the appended claims.

The invention claimed is:

1. A thickener consisting essentially of the free radical addition product obtained by the emulsion polymerization of:
   (a) 3–15 parts styrene;
   (b) 15–45 parts ethyl acrylate;
   (c) 30–60 parts of at least one acid having the formula:

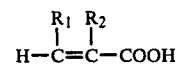

wherein R$_1$ and R$_2$ can be the same or different and are hydrogen or lower alkyl of 1 to about 3 carbons; and (d) 10–25 parts of a mixture of esters; wherein the mixture of esters is the condensation reaction product of reactive amounts of (i) an ethylenically unsaturated cyclic carboxylic acid anhydride containing from 4 to about 8 carbon atoms; and (ii) an ethoxylated alcohol having the general formula:

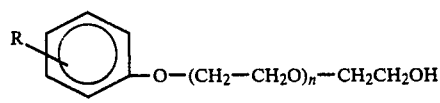

wherein R is from one to three aliphatic radicals of 1 to about 30 carbon atoms each and n is an integer from about 6 to 150; and (iii) a diol containing from about 2 to about 10 carbon atoms.

2. The thickener of claim 1 further characterized in that the acid is methacrylic acid.

3. The thickener of claim 1 further characterized in that the anhydride is maleic anhydride.

4. The thickener of claim 1 further characterized in that the ethoxylated alcohol as the formula:

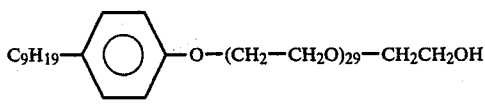

5. The thickener of claim 1 further characterized in that the mixture of esters is the condensation reaction product obtained by admixing at reaction temperatures about 1.0 mole of anhydride for each chemical equivalent of hydroxyl.

6. The thickener of claim 1 further characterized in that the mole ratio of ethoxylated alcohol to diol is at least 1.1/1.

7. The thickener of claim 1 further characterized in that the mole ratio of ethoxylated alcohol to diol is between 2/1 and 15/1.

8. The thickener of claim 1 further characterized in that the mixture of esters consists essentially of the condensation reaction product of maleic anhydride, an ethoxylated alcohol having the formula:

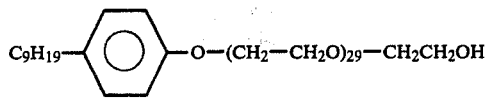

and 1,6 hexane diol in a mole ratio of approximately 10/8/1.

9. A process for thickening an aqueous system comprising water and a natural or synthetic polymer, which process comprises adding a thickening amount of an in situ thickener to said aqueous system, and adjusting the system to a pH of at least about 6.0, wherein said thickener consists essentially of the free radical addition product obtained by the emulsion polymerization of:
(a) 3-15 parts styrene;
(b) 15-45 parts ethyl acrylate;
(c) 30-60 parts of at least one acid having the formula:

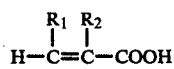

wherein $R_1$ and $R_2$ can be the same or different and are hydrogen or lower alkyl of 1 to about 3 carbons; and
(d) 10-25 parts of a mixture of esters; wherein the mixture of esters is the condensation reaction product of reactive amounts of (i) an ethylenically unsaturated cyclic carboxylic acid anhydride containing from 4 to about 8 carbon atoms; and (ii) an ethoxylated alcohol having the general formula:

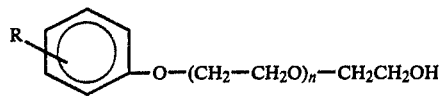

wherein R is from one to three aliphatic radicals of 1 to about 30 carbon atoms each and n is an integer from about 6 to 150; and (iii) a diol containing from about 2 to about 10 carbon atoms.

10. The process of claim 9 further characterized in that the acid is methacrylic acid.

11. The process of claim 9 further characterized in that the anhydride is maleic anhydride.

12. The process of claim 9 further characterized in that the ethoxylated alcohol has the formula:

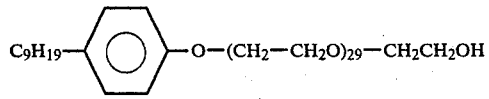

13. The process of claim 9 further characterized in that the mixture of esters in the condensation reaction product obtained by admixing at reaction temperatures about 1.0 mole of anhydride for each chemical equivalent of hydroxyl.

14. The process of claim 9 further characterized in that the mole ratio of ethoxylated alcohol to diol is at least 1.1/1.

15. The process of claim 9 further characterized in that the mole ratio of ethoxylated alcohol to diol is between 5/1 and 10/1.

16. The process of claim 9 further characterized in that the mixture of esters consists essentially of the condensation reaction product of maleic anhydride, an ethoxylated alcohol having the formula:

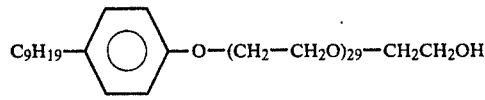

and 1,6 hexane diol in a mole ratio of approximately 10/8/1.

17. The process of claim 9 wherein the pH is adjusted to a level of from about 6.0 to about 10.0.

18. A coating composition which comprises a natural or synthetic latex vehicle; and a thickening amount of a thickener consisting essentially of the free radical addition product obtained by the emulsion polymerization of:
(a) 3-15 parts styrene;
(b) 15-45 parts ethyl acrylate; (c) 30-60 parts of at least one acid having the formula:

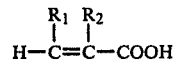

wherein $R_1$ and $R_2$ can be the same or different and are hydrogen or lower alkyl of 1 to about 3 carbons; and
(d) 10-25 parts of a mixture of esters; wherein the mixture of esters is the condensation reaction product of reactive amounts of (i) an ethylenically unsaturated cyclic carboxylic acid anhydride containing from 4 to about 8 carbon atoms; and (ii) an ethoxylated alcohol having the general formula:

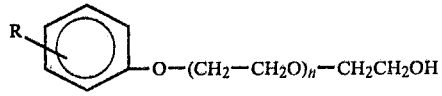

wherein R is from one to three aliphatic radicals of 1 to about 30 carbon atoms each and n is an integer from about 6 to 150; and (iii) a diol containing from about 2 to about 10 carbon atoms.

19. The coating of claim 18 further characterized in that the acid is methacrylic acid.

20. The coating of claim 18 further characterized in that the natural or synthetic vehicle is selected from the group consisting of acrylic latices and vinyl acrylic latices.

21. The coating of claim 18 further characterized in that the anhyride is maleic anhydride.

22. The coating of claim 18 further characterized in that the ethoxylated alcohol has the formula:

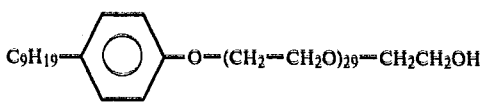

23. The coating of claim 18 further characterized in that the mixture of esters in the condensation reaction product obtained by admixing at reaction temperatures about 1.0 mole of anhydride for each chemical equivalent of hydroxyl.

24. The coating of claim 18 further characterized in that the mole ratio of ethoxylated alcohol to diol is at least 1.1/1.

25. The coating of claim 18 further characterized in that the mole ration of ethoxylated alcohol to diol is between 2/1 and 15/1.

26. The coating of claim 18 further characterized in that the mixture of esters consists essentially of the condensation reaction product of maleic anhydride, an ethoxylated alcohol having the formula:

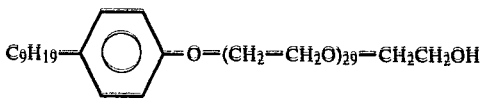

and 1,6 hexane diol in a mole ratio of approximately 10/8/1.

27. A coating composition which comprises a natural or synthetic latex vehicle; polymeric vesiculated beads; and a thickening amount of a thickener consisting essentially of the free radical addition product obtained by the emulsion polymerization of:

(a) 3–15 parts styrene;
(b) 15–45 parts ethyl acrylate;
(c) 30–60 parts of at least one acid having the formula:

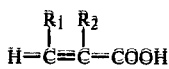

wherein $R_1$ and $R_2$ can be the same or different and are hydrogen or lower alkyl of 1 to about 3 carbons; and (d) 10–25 parts of a mixture of esters; wherein the mixture of esters is the condensation reaction product of reactive amounts of (i) an ethylenically unsaturated cyclic carboxylic acid anhydride containing 4 to about 8 carbon atoms; and (ii) an ethoxylated alcohol having the general formula:

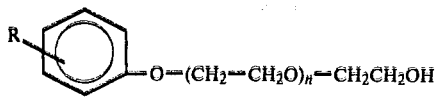

wherein R is from one to three aliphatic radicals of 1 to about 30 carbon atoms each and n is an integer from about 6 to 150; and (iii) a diol containing from about 2 to about 10 carbon atoms.

28. The coating of claim 27 further characterized in that the acid is methacrylic acid.

29. The coating of claim 27 further characterized in that the natural or synthetic vehicle is selected from the group consisting of acrylic latices and vinyl acrylic latices.

30. The coating of claim 27 further characterized in that the anhydride is maleic anhydride.

31. The coating of claim 27 further characterized in that the ethoxylated alcohol has the formula:

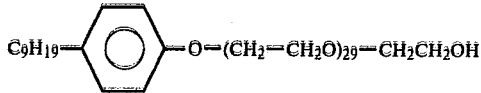

32. The coating of claim 27 further characterized in that the mixture of esters is the condensation reaction product obtained by admixing at reaction temperatures about 1.0 mole of anhydride for each chemical equivalent of hydroxyl.

33. The coating of claim 27 further characterized in that the mole ratio of ethoxylated alcohol to diol is at least 1.1/1.

34. The coating of claim 27 further characterized in that the mole ratio of ethoxylated alcohol to diol is between 5/1 and 10/1.

35. The coating of claim 27 further characterized in that the mixture of esters consists essentially of the condensation reaction product of maleic anhydride, an ethoxylated alcohol having the formula:

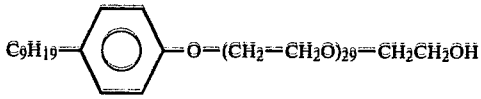

and 1,6 hexane diol in a mole ratio of approximately 10/8/1.

* * * * *